INVENTOR
William R. Hewitt

W. R. HEWITT.
STEERING GEAR.
APPLICATION FILED JUNE 13, 1917.

1,266,944.

Patented May 21, 1918.
3 SHEETS—SHEET 3.

WITNESSES:
Charles Bekeles
Julius C. Benesch

INVENTOR
William R. Hewitt,
BY Strong & Townsend
ATTORNEYS

UNITED STATES PATENT OFFICE.

WILLIAM R. HEWITT, OF SAN FRANCISCO, CALIFORNIA.

STEERING-GEAR.

1,266,944.   Specification of Letters Patent.   Patented May 21, 1918.

Application filed June 13, 1917.  Serial No. 174,478.

*To all whom it may concern:*

Be it known that I, WILLIAM R. HEWITT, a citizen of the United States, residing at the city and county of San Francisco and State of California, have invented new and useful Improvements in Steering-Gears, of which the following is a specification.

This invention relates to a steering gear for vessels.

One of the objects of the present invention is to provide a power-operated steering gear which is simple and substantial in construction and adapted to be readily attached to any standard form of hand-operated steering gear now employed. Another object of the invention is to provide a steering gear of the character described which may be driven from a continuously revolving driving unit, such as an electric motor or the like, and which is so arranged and connected that temporary or permanent disablement of the power driving unit will not interfere with the operation of the hand steering gear. Further objects will hereinafter appear.

The invention consists of the parts and the construction and combination of parts as hereinafter more fully described and claimed, having reference to the accompanying drawings, in which—

Figure 1:
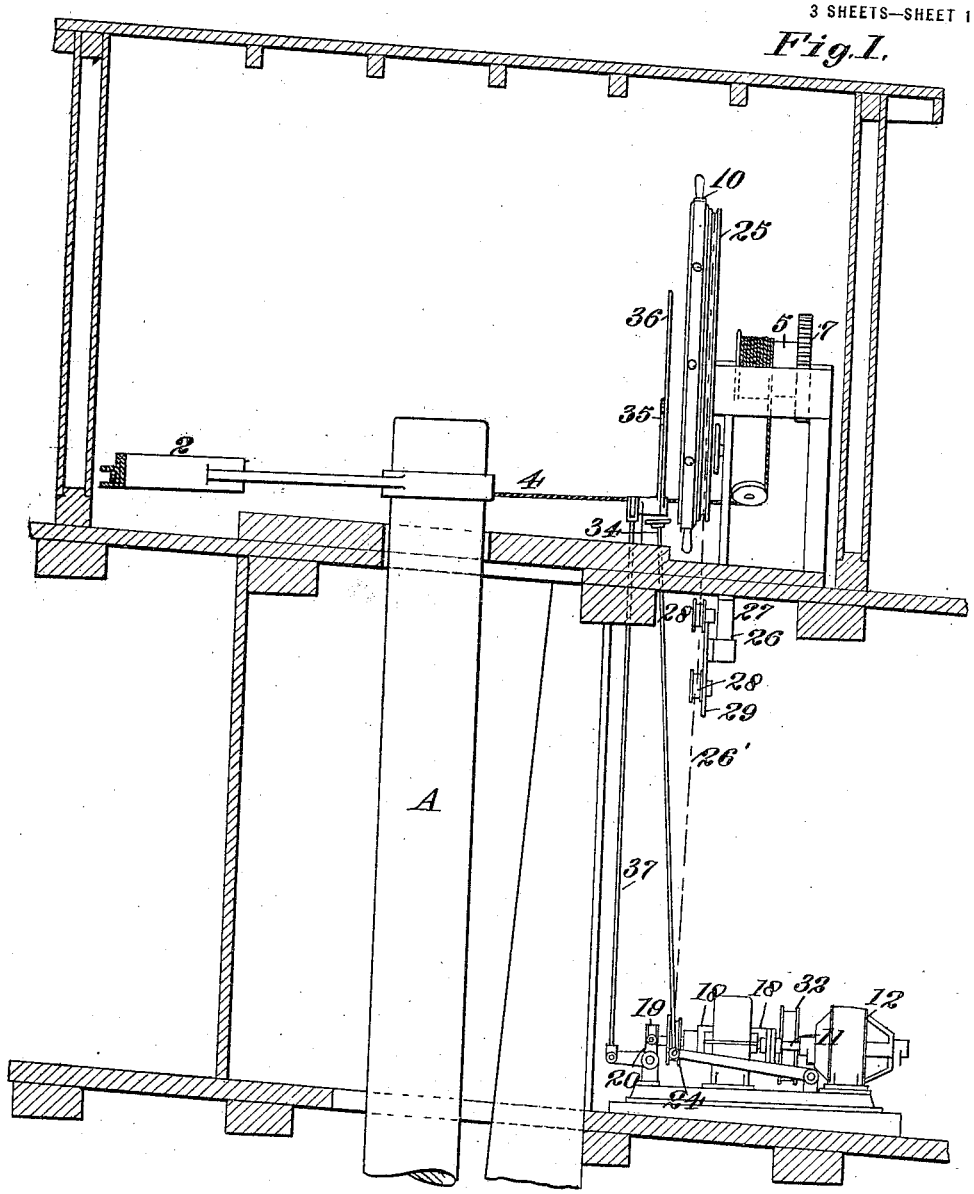
Figure 1 is a side elevation of the steering gear.
Figure 2:
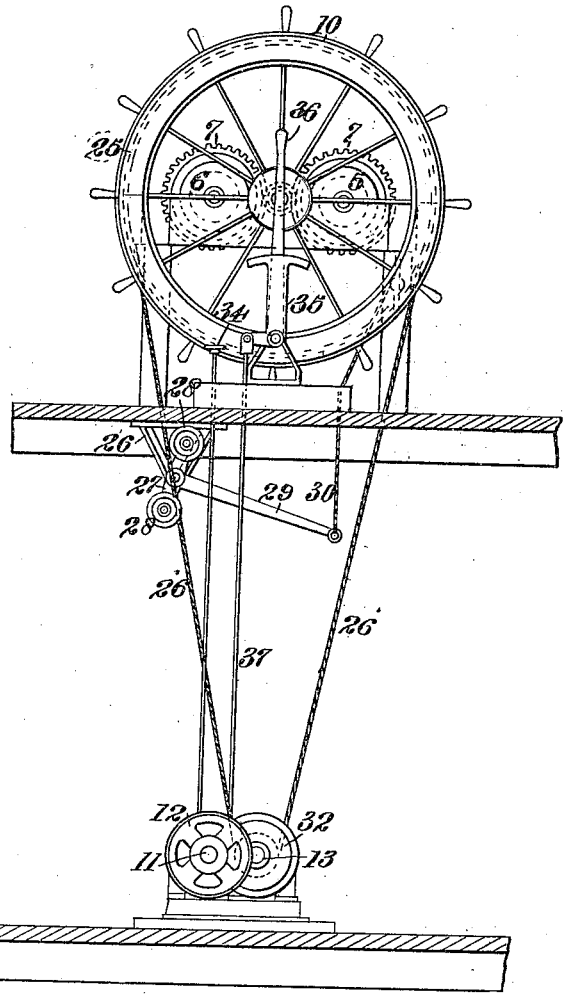
Fig. 2 is a front view of same.
Figure 3:
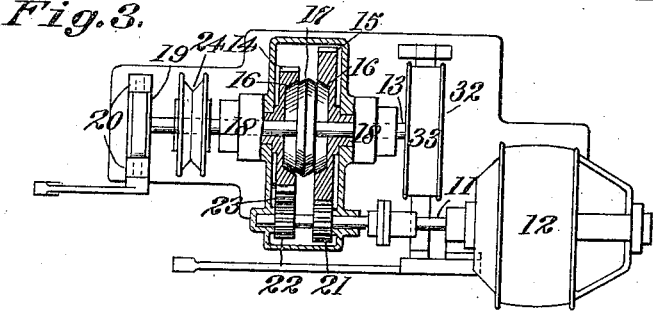
Fig. 3 is an enlarged, horizontal, longitudinal section through the clutch transmission.
Figure 4:
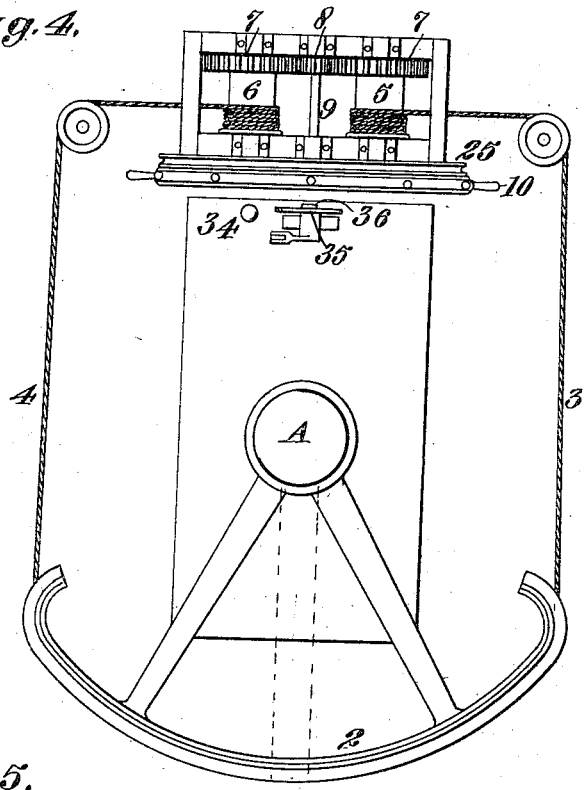
Fig. 4 is a plan view of Fig. 1.

Referring to the drawings in detail, A indicates the rudder post on the vessel, 2 the quadrant or tiller secured to same, 3 and 4 the tiller ropes, 5 and 6 the winding and unwinding drums, 7 a gear secured upon each drum, 8 an intermediate gear meshing with said gears, 9 the steering wheel shaft, and 10 the steering wheel. Mounted in approximate alinement with the steering wheel shaft 9 and below same is a main shaft 11 which is continuously driven by an electric motor 12, and mounted on one side of the shaft 11 in parallelism with same is a secondary shaft 13. Turnably mounted on the shaft 13 is a pair of interspaced gears 14 and 15, and formed on the interior face of each gear is a cone face 16 which is adapted to coöperate with a double cone clutch 17, keyed or otherwise rigidly secured upon the shaft 13. The shaft is otherwise mounted in bearings 18, and a collar 19, secured on the shaft adapted to be operated by a forked lever 20, permits the shaft to be moved in the bearings in one direction or the other to throw the clutch 17 into engagement with one or the other of the cone faces of the gears 14 and 15.

Secured on the driving shaft 11 and intermeshing with gear 15 is a driving pinion 21 and secured on the same shaft, in alinement with gear 14, is a driving pinion 22 which intermeshes with a reversing pinion 23 positioned so as to be constantly in mesh with the gears 14 and 22. Power transmitted through the gears 21 and 22 will in this manner revolve the gear 14 in one direction and the gear 15 in the opposite direction, thereby permitting the secondary shaft 13 to be turned in either direction through means of the clutch 17.

Secured on the secondary shaft is a pulley 24 and secured on the rear face of the steering wheel 10 is a pulley 25. A cable or belt 26′, carried by said pulleys, permits power to be transmitted from the secondary shaft to turn the steering wheel and said steering wheel when turned will, of course, transmit power through the drums 5 and 6 and the tiller ropes 3 and 4 to turn the quadrant and rudder in the direction desired.

Pivotally mounted in a bracket 26 is an arm 27, and journaled in each end of said arm is an idler pulley 28, one engageable with one side of the belt 26′ and the other with the opposite side. Formed integral with the arm 27 or otherwise secured is a lever 29 and attached to said lever is a rope 30, the free end of which is adapted to be secured on a cleat 31. The idlers 28 when rocked by the arms 29, through means of the rope 30, permit the belt 26′ to be quickly tightened or slackened, as will hereinafter be described.

Secured on the secondary shaft is a brake drum 32 and surrounding said brake drum is a band 33 which is adapted to be slackened or tightened in the usual manner by a foot-operated treadle 34 positioned within convenient reach of the quartermaster or other individual handling the steering. Pivotally mounted in front of the wheel in a bracket 35 is a lever 36 which will hereinafter be termed the steering lever, and connecting said lever with the clutch collar arm 20 is a link or rod 37.

The operation of the steering gear will be as follows: With the motor shaft 11 continuously revolving and transmitting power to turn the gears 14 and 15 in opposite directions, it can be seen that the secondary shaft will stand idle as long as the clutch 17 assumes an intermediate position between the coöperating cone faces formed on the respective gears. Movement of lever 36 about its pivot in the bracket 35 will, however, transmit movement through the link 37 and the arm 20 to move the shaft 13 and clutch 17 into engagement with one or the other of the clutches. Power is transmitted to revolve the secondary shaft in one direction or the other and this turning movement of the shaft is in turn transmitted through the belt 26' to the steering wheel drums 5 and 6, tiller ropes and the quadrant to turn the rudder in the desired direction. Quick and responsive action, as far as the rudder or helm is concerned, is in this manner secured and it is also possible to lock the steering wheel, together with the rudder controlled thereby, in any position desired by merely stepping on the foot treadle 34 as this treadle, when actuated, tightens the brake band on the drum 32, thereby locking the shaft against turning. The rudder, if turned hard to one side or the other may, therefore, be held without depending upon the clutches as long as desired, thereby relieving the clutches of excessive wear and abuse.

If the motor 12 or any of the driven parts connected therewith should become temporarily or permanently disabled, it is possible to operate the steering gear by the hand-wheel 10, this being accomplished by slackening the belt 26' through means of the rope 30, lever 29 and the idlers 28. These, when thrown out of engagement with the belt, slacken the belt to such an extent that the steering wheel may be freely turned without affecting the rest of the connected mechanism.

While the motive power here employed is indicated by an electric motor, it is obvious that any other source of power, such as steam, gas, or the like may be employed. I also wish it understood that various changes in form, proportions and minor details of construction may be resorted to within the scope of the appended claims and that I do not wish to limit myself to the specific design and construction here shown.

Figure 5:
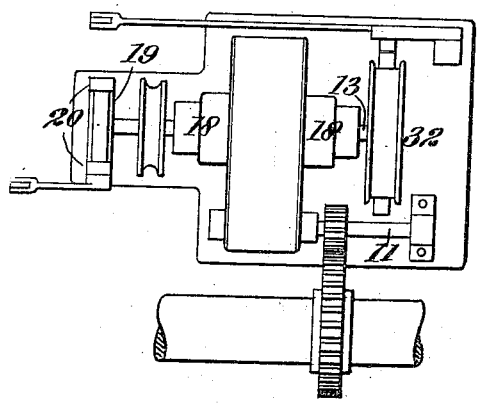
Fig. 5 shows the secondary shaft arranged to be driven from the propeller shaft.

It is also possible to drive the secondary shaft from the propeller shaft, as illustrated in the modification shown in Fig. 5.

Having thus described my invention, what I claim and desire to secure by Letters Patent is—

1. In combination with the steering wheel of a vessel, continuously actuated driving means, reversible and shiftable driven means operated by said driving means, a vertical lever pivoted at its base in front of the steering wheel and in a position adjacent the center of the latter, means connected to the lever and to said driven means for shifting the latter to neutral and reverse positions, means actuated by the driven means to operate the steering wheel, means to lock the driven means against movement in neutral position, means connected to the locking means and operable from a point adjacent the lever to effect locking of the driven means and therethrough the steering wheel, and means also operable from a point adjacent the lever for enabling manual control of the steering wheel during operation of the driving means and with the driven means locked.

2. In combination with the steering wheel of a vessel, continuously actuated driving means, reversible and shiftable driven means operated by said driving means, means for shifting said driven means to neutral and reverse positions, means to lock said driven means in neutral position, means to operate the steering wheel from said driven means, and means to enable manual operation of the steering wheel with said driven means in locked position and during operation of the driving means.

3. In combination with the steering wheel of a vessel, continuously actuated driving means, a belt connected to the wheel and said driving means for operating the former from the latter, means to normally tension the belt to cause same to drive the wheel, and means operable at will and from a position adjacent the steering wheel whereby to enable release of said tensioning means so as to allow slippage of the wheel and manual turning of the latter independent of the driving means.

In testimony whereof I have hereunto set my hand in the presence of two subscribing witnesses.

WILLIAM R. HEWITT.

Witnesses:
JOHN H. HERRING,
W. W. HEALEY.

Copies of this patent may be obtained for five cents each, by addressing the "Commissioner of Patents, Washington, D. C."